United States Patent [19]

Brooks et al.

[11] Patent Number: 5,158,918

[45] Date of Patent: * Oct. 27, 1992

[54] LOW MOISTURE THIXOTROPIC AGENTS, METHODS AND USES

[75] Inventors: Lamar E. Brooks, 57 Temple Rd., Wellesley, Mass. 02181; Gerald L. Brooks, Wellesley, Mass.

[73] Assignee: Lamar E. Brooks, Wellesley, Mass.

[ * ] Notice: The portion of the term of this patent subsequent to Sep. 17, 2008 has been disclaimed.

[21] Appl. No.: 720,011

[22] Filed: Jun. 24, 1991

Related U.S. Application Data

[63] Continuation-in-part of Ser. No. 489,065, Mar. 5, 1990, Pat. No. 5,049,532, which is a continuation-in-part of Ser. No. 321,588, Mar. 10, 1989, Pat. No. 4,966,871.

[51] Int. Cl.$^5$ ............................................. C04B 33/30
[52] U.S. Cl. ................................ 501/148; 501/150; 501/141; 524/297; 524/445
[58] Field of Search ....................... 501/148, 150, 141; 524/445, 297

[56] References Cited

U.S. PATENT DOCUMENTS 4,966,871 10/1990 Brooks ................................ 501/150
5,049,532 9/1991 Brooks et al. ...................... 501/150

OTHER PUBLICATIONS

Hackh's *Chemical Dictionary*, 5th Ed., p. 60.
Kirk-Othmer Encyclopedia of Chem. Tech., vol. 17, John-Wiley, 1978, 3rd ed., p. 809.
Grim, Ralph, Clay Mineralogy, McGraw Hill, 1968, pp. 32, 44, 45, 113-114, 154, 183, 189, 343-347,383, 422, 468 and 582.
Haden, W. L., Jr. (Patton, ed.), "Hydrated Magnesium Silicate", *Pigment Handbook*, vol. 1, Wiley-Interscience, 1973, pp. 269-273.

*Primary Examiner*—Mark L. Bell
*Assistant Examiner*—Deborah Jones

[57] ABSTRACT

Thioxotropic Fuller's earth clay minerals which are structurally double silica chains linked together through oxygen to form double-ribbed sheets held by aluminum and/or magnesium in octahedral coordination in an amphibole chain are vacuum dried and admixed with a stabilizing fluid, e.g., silicone fluid, to result in new, low moisture content thixotropic agents. The mineral products thus produced are superior thixotropes when compounded in plastics such as plastisols, adhesive sealants, coatings and other organic binder systems which are heat set or heat cured or moisture cured, and compliance coatings.

The methods involve reducing the moisture content of Fuller's earth clay, e.g., attapulgite, by (1) heating it under vacuum at an elevated temperature, preferably between 100° C. and 300° C., or (2) heating it at an elevated temperature, preferably between 100° C. and 350° C., and adding a stabilizing fluid, or (3) heating it under vacuum at an elevated temperature, preferably below 300° C. and adding a stabilizing fluid, to preserve its low moisture properties.

16 Claims, No Drawings

5,158,918

LOW MOISTURE THIXOTROPIC AGENTS, METHODS AND USES

This application is a continuation-in-part of application Ser. No. 489,065 filed Mar. 5, 1990, now U.S. Pat. No. 5,049,532 which is a continuation-in-part of application Ser. No. 321,588 filed Mar. 10, 1989, now U.S. Pat. No. 4,966,871 issued Oct. 30, 1990.

TECHNICAL FIELD

This invention relates to plastics and coatings comprising thixotropic agents and more particularly, but not by way of limitation, to methods of producing Fuller's earth clays without destroying the thixotropic properties of the clays by reducing the moisture content to a level which permits the clay to be used as a thixotrope in plastics, including plastisols and adhesive sealants, coatings and other organic binder systems which are heat set or heat cured or moisture cured, and compliance coatings.

BACKGROUND ART

The production of compounded plastics requires the use of low moisture content thixotropic agents to achieve satisfactory film integrity. For the purposes of the present invention the term "compounded plastic" is used to comprehend within its scope various forms and kinds of plastics which would include but is not limited to plastisols, adhesive sealants, coatings including compliance coatings and moisture cured coatings, and other organic binder systems which are heat set or heat cured or moisture cured.

Thixotropic agents are used in the production of compounded plastics which are applied to metal or other materials, for example, the coatings found on the wire baskets in a dishwasher or refrigerator. The use of the thixotrope permits the uniform application of the plastisol film to the object which is to be coated and the retention of that relatively uniform film during curing. In heat set (i.e., plastics which cannot be reformed) and heat cured (i.e., plastics which may be reformed by reheating) applications, the moisture content of the plastisols must be low enough to prevent the excessive release of moisture upon heating. Excessive amounts of moisture released during heating can cause bubbles to form in the plastisol coating, which causes reduced film continuity (a coating which contains voids), localized areas where the film does not adhere to the surface coated, and a less desirable appearance. Also, small quantities of moisture released during curing, although producing no visable blemish, can affect film integrity thereby causing, for example, reduced corrosion protection.

Changing requirements for coatings, including moisture cured (i.e., coating compositions that remain in the liquid state indefinitely when stored in a sealed container but are cured to the desired hardness when applied to the intended object, by moisture present in the atmosphere), heat set and heat cured primer and topcoat finishes, and higher solids compliance coatings to meet volatile organic compounds (VOC's) emissions standards present the coating formulations chemist with major constraints. The presence of free water in the pigments and other components limits the effectiveness of some recommended substitute compliance coatings. The problem of flow behavior of high solids coatings has not been completely solved. Additionally, poor humidity resistance of heat set or heat cured coatings or the premature activation of moisture cured coatings is the result of free water present in the pigments selected for the formulation.

Previously, the mineral asbestos processed by Johns-Manville Corporation, Union Carbide Corporation and others served as an effective thixotrope for plastisols, adhesive sealants, coatings and other organic binder systems. Thixotropic asbestos is processed to result in low moisture, typically less than 2% free moisture content. Asbestos had been considered a preferred cost effective thixotrope in these applications. Environmental and health considerations, as well as governmental regulations, limit its use and create a need for a suitable substitute thixotrope for use in heat set plastisol formulations and thermoplastic formulations, and compliance coatings.

Pyrogenic silica such as "CAB-O-SIL" by Cabot Corporation has been used as a substitute thixotrope for asbestos in plastisols, adhesive sealants, and other organic binder systems which are heat set or heat cured. The high cost of pyrogenic silica, however, creates an economic limitation on its use. Further, with time, pyrogenic silica is likely to absorb moisture, reducing its desirability as a thixotrope in, for example, plastisols.

Many clays, notably kaolinite clays, are used extensively as fillers in plastics. In such applications, the clays are used not as a thixotrope, but to achieve reduced shrinkage during curing, to obscure the fiber pattern of glass reinforcement and to increase resistance to chemical action and weathering.

Fuller's earth clays from the group consisting of sepiolite, palygorskite and attapulgite are effective thixotropes. Attapulgite, hydrated magnesium silicate clay processed by Engelhard Co., Floridin Co. and others is a particularly effective thixotrope. Thixotropic attapulgite and sepiolite are widely used as drilling mud in the drilling of oil wells. As commercially prepared, thixotropic attapulgite contains typically 10% to 15% moisture at 100° C. Undesirable quantities of the moisture contained in typically prepared thixotropic Fuller's earth is released when used as a thixotropic agent in plastics such as plastisols and adhesive sealants, and other organic binder systems which are heat set, or moisture or heat cured. When typically prepared attapulgite is used in plastisols, for example, which are heat cured at about 100° C., the moisture in the attapulgite volatilizes and deforms the structure of the plastisol, reducing its film continuity. This moisture release limits or precludes the use of typical attapulgite as a thixotropic agent for most heat set or heat cured applications.

Thixotropic grade attapulgite is processed commercially in carefully controlled drying ovens. The literature teaches that drying temperatures above approximately 400° C. agglomerate the mineral particles and destroy the ability to disperse the clay in the form of colloidally active ultimate particles. The inventors do not know with certainty, but suspect that at this high temperature, refluxing of the water back into the clay structure is prevented, causing sintering of the attapulgite.

Bentonite clays treated with amine surfactants can become suitable thixotropic agents when the treated bentonite is mixed with an alcohol, water or other hydroxyl contributing agent by the user. However, bentonite so treated is not a suitable thixotrope for heat set or heat cured plastisols, or compliance coatings, because of the excessive moisture content. Release of the moisture from the treated bentonite clays in heat set or heat cured plastisols results in an undesirable film having a deformed surface, reduced continuity, voids and localized areas of nonadhesion.

Thus, the present invention produces an economical and environmentally safe alternate to the principal thixotropic agent previously used, asbestos.

DISCLOSURE OF THE INVENTION

The present invention may be briefly described as a thixotropic grade Fuller's earth clay and methods for producing such thixotrope, that is suitable for use in plastics, including plastisols and adhesive sealants, coatings and other organic binder systems which are heat set or heat cured or moisture cured, and compliance coatings, as well as compounded plastics comprising such thixotropes. As disclosed in above cited U.S. Pat. No. 4,966,871, one such method comprises drawing a vacuum on attapulgite and heating it at a temperature sufficient to drive the free moisture from the attapulgite without destroying its thixotropic properties. The thixotropic agent is dried to a desired moisture content and then removed from the vacuum.

Another method disclosed in above cited application Ser. No. 489,065 comprises drying the attapulgite below about 350° C. for a time sufficient to reduce the water content to the desired level, followed by intimately admixing the intermediate dried product with a silicone fluid.

We have discovered yet another method to further reduce the free moisture from Fuller's earth without destroying its thixotropic properties, for use where thixotropes with a moisture content below about 2% are required. Such method comprises drying Fuller's earth in a vacuum at a temperature sufficient to drive the free water from the Fuller's earth without destroying its thixotropic properties, and intimately admixing with a fluid capable of preserving the low moisture condition, e.g., silicone fluid.

The art of compounding plastics is well developed and covers a myriad of possible formulations. In general a plastic resin, e.g., polyvinyl chloride, is compounded with plasticizers, filler and stabilizers. The plastic resin may be one which is heat set or heat cured. The selection of a plasticizer is governed by the properties desired in the final product. Properties commonly affecting plasticizer selection are thermal conductivity, electric conductivity, light stability, color stability, corrosion resistance, flame retardance and flexibility. Suitable plasticizers include dioctyl phthalate, diisooctyl phthalate, diisodecyl phthalate, epoxidized oils, esters of carboxylic acids or phosphoric acid, polyglycols, ethers and sulfonamides. Appropriate stabilizers are used to inhibit degradation of the plastic by oxygen and ultraviolet radiation, and include salicylic acid, 2-hydroxybenzophenone, lead salts, barium, cadmium, zinc and stearic acid. Bonding agents that are useful for the present invention are those that promote adhesion to the substrate and include triethylene glycol dimethacrylate.

The strength, durability and color of plastics are varied by the incorporation of fillers such as pigments, clays and glass fibers. Thixotropic agents are added to plastics or coatings in order to achieve the efficient and uniform application of plastic films during manufacture, for example, in the production of plastic coated wire baskets and shelves in home appliances.

The art of formulating compliance coatings, i.e., to meet national and state regulations on emissions of VOC's, is very recent and not well developed. For many applications, suitable substitutes have simply not been developed. Approaches to the problem of reducing emissions include: () applications techniques including powder coatings, hot-melt coatings and radiation cured coatings, (2) re-design of polymer binders and coating reformulation and (3) use of compliance solvents. Recent research focuses on formulating with low molecular weight oligomers and telechelic resins which are converted in, for example, a bake cycle.

In contrast, typical medium to high molecular weight epoxy resin contains many backbone hydroxyls and is cured through these hydroxyls by curing agents and/or high temperature. These high molecular weight resins require non-compliant solvent for coatings applications, but can tolerate free water in the associated pigments.

The new low molecular weight oligomer approach is, for example, to react epichlorohydrin with bisphenol A. This low molecular weight liquid epoxy resin contains few hydroxyl groups and is cured through the epoxide groups. This system is much less tolerant of free water in the pigments used.

Typical curing agents for low molecular weight epoxy resins of this type include polyamides, polysulfides, aromatic amines, aliphatic amines and amidoamines. Low molecular weight oligomers of epoxy, phenolic and combinations thereof have application for compliance coatings.

Thixotropic agents are added to these low molecular weight oligomer systems where the resin melt viscosity is typically below about 4000 cps, in order to achieve the efficient and uniform application of the coating during manufacture, for example, on conveyor line finishing of aerospace/military components.

The field of organic coatings where this invention has application includes non-hydroxyl coating systems such as acrylic, epoxy, vinyl acetate, vinyl chloride, vinylidene chloride, vinyl butyral, styrene, alkyd, melamine, isocyanate, polyester, phenolic, cellulose, and by specific example, moisture cured urethane resin systems. In general, a resin from the group above may be solubilized in an aliphatic and/or aromatic and/or chlorocarbon solvent and then pigments, fillers, coloring agents and thixotropic agents are incorporated in the coating composition.

The present invention has particular value in plastisols of the following general formula:

| Material | Parts by Weight |
| --- | --- |
| Polyvinyl chloride resin | 100 |
| Dioctyl phthalate | 45-100 |
| Epoxidized oil | 0-5 |
| Octyl epoxy stearate | 0-40 |
| Stabilizer | 1-5 |
| Filler | 0-100 |
| Stearic acid | 0-2 |
| Thixotrope | 2-15 |

Another application of the invention is in adhesive sealants of the following general formula:

| Material | Parts by Weight |
| --- | --- |
| Polyvinyl chloride | 100 |
| Dioctyl phthalate | 5-100 |
| Tricresyl phosphate | 0-100 |
| Filler | 35-200 |
| Stabilizer | 1-5 |
| Bonding agent | 0-20 |

| Material | Parts by Weight |
|---|---|
| Thixotrope | 2-15 |

Still another application of the invention is in coatings of the following general formula:

| Material | Parts by Weight |
|---|---|
| Acrylic, epoxy, vinyl, melamine, alkyd, urethane, isocyanate, phenolic or cellulose resin | 100 |
| Amine, amide or sulfide curing agent | 0-125 |
| Aliphatic solvent | 2-200 |
| Aromatic solvent | 0-100 |
| Chlorocarbon solvent | 0-100 |
| Pigment | 2-100 |
| Filler | 0-150 |
| Thixotrope | 2-15 |

Preferred thixotropes produced by the present invention are Fuller's earth clays which have been vacuum dried to a moisture content below 5% and intimately admixed with a stabilizing fluid to preserve the low moisture state thus created. The inventors previously disclosed in U.S. Pat. No. 4,966,871 a method for vacuum drying thixotropic attapulgite to from about 2% to about 5% moisture, and in application Ser. No. 489,065 a method for drying by conventional methods and intimately admixing with silicone to result in a thixotropic attapulgite having a moisture content of from about 2% to about 5%.

The structure of Fuller's earth clays as explained in the literature is thought to be represented by double silica chains running parallel to one another, with the chains linked together through oxygen atoms at their longitudinal edges to form a kind of double-ribbed sheet. The ribbed sheets are arranged so that the sheets point together and are held together by aluminum and/or magnesium in octahedral coordination between apex oxygens of successive sheets, forming an amphibole chain. Chains of water molecules run parallel to the amphibole chains and fill the interstices between the chains.

The cavities of attapulgite will accommodate 4 molecules of water per unit cell, and this zeolitic water (i.e., loosely held in the lattice) would account for the dehydration loss at low temperatures. Attapulgite exhibits a characteristic diffraction spacing of 10.48A which does not change with variations in relative humidity or moderate heating up to about 300° C. Differential thermal curves for attapulgite show an initial endothermic reaction below about 200° C. and additional endothermic reactions at about 225° C. to 350° C., which correspond approximately to the intervals of abrupt water losses shown by the dehydration curves. At 300° C. to 350° C., the ribbons of attapulgite take a tilted position. The original structure may be regained if heating is discontinued because attapulgite rehydrates readily. At above 400° C., the fiber length contracts rapidly. This is explained by a closing of the cavities which leads to the disappearance of the water-absorbing property. Fuller's earth clays dried above 400° C. exhibit no thixotropic properties.

Without wishing to be bound by any particular theory, it is believed that the invention functions by removing water from the Fuller's earth clay minerals without disrupting the amphibole chain structure, without losing absorption capacity and without altering thixotropic properties. It is known that when temperature alone is applied to drive off the water under normal atmospheric pressure, the results obtained are: (1) when heated below about 350° C., the water refluxes to the original site upon lowering the temperature or (2) when heated above about 350° C., the moisture content remains lowered and reflux is prevented. It is believed that this results from the collapse of the double-ribbed structure of attapulgite which occurs in the temperature range of 300° C. to 400° C. as described above.

As a result, Fuller's earth clays, including attapulgite and sepiolite, cannot be dried under normal atmosphere to a moisture content which is compatible for use in plastics or coatings without destruction of the structure which provides the thixotropic properties.

The inventors have found that the thixotropic properties of Fuller's earth clays can be preserved and reflux of moisture can be prevented by (1) drying Fuller's earth under a vacuum at temperatures in the range of about 100° C. to 300° C. or (2) drying Fuller's earth by conventional (non-vacuum) methods at temperatures in the range of about 100° C. to 350° C. and then intimately admixing silicone in a mixer or (3) drying Fuller's earth under a vacuum at temperatures ranging up to about 300° C. and then intimately admixing a stabilizing fluid, e.g., silicone, in a mixer. As will be appreciated, vacuum processes should remove water from the clay at temperatures far below ambient, but for practical purposes we prefer to work at least above 80° C.

The inventors would postulate that (1) the removal of all the zeolitic water from the Fuller's earth clay mineral without destruction of the double-ribbed structure or (2) the removal of a substantial amount of the zeolitic water and replacing this zeolitic water with a stabilizing fluid, e.g., silicone fluid, to fill the interstices between the chains of the above mentioned ribbed sheets prevents the destruction of the double-ribbed structure and that reflux is prevented by removal of the zeolitic water and blocking the cavities with the stabilizing fluid.

DETAILED DESCRIPTION

The present invention is directed to the use of thixotropes in the application of plastics, including plastisols, adhesive sealants and coatings which are cured by heat or moisture, and compliance coatings. Fuller's earth clays are effective and attapulgite clay is a preferred thixotrope for these applications because it is readily available commercially and produces a viscosity ratio approximating previously used thixotropic asbestos. The inventors have found very desirable thixotropic Fuller's earth clays and a plurality of methods for their production.

One method is to heat a commercially available thixotropic attapulgite having a moisture content between 10% and 15% in a vacuum at a temperature between approximately 100° C. and 300° C. for a period sufficient to reduce the moisture content of the attapulgite to a desired level, typically below 5% moisture, measured by ASTM D-280-A. Another method is to heat a commercially available thixotropic attapulgite with a moisture content between 10% and 15% in a conventional (non-vacuum) oven at a temperature between approximately 100° C. and 350° C. for a period sufficient to reduce the moisture content of the attapulgite to a desired level, typically below 5% moisture, followed by intimately admixing with a silicone fluid in a mixer.

The inventors have found that a very low moisture content thixotropic attapulgite may be produced by heating a commercially available thixotropic attapulgite having a moisture content typically between 10% and 15% in a vacuum between about 1 Torr and $10^{-4}$ Torr at a temperature ranging up to about 300° C. for a period sufficient to reduce the free water content of the attapulgite to a level between about 0.1% and about 5.0%, measured by ASTM D-280-A, and retaining the attapulgite in this low moisture state until admixed with a stabilizing fluid in a mixer. The surface treatment of the thixotropic agent in accordance with this improved method consists of the admixture of 0.1% to 10% by weight of a stabilizing fluid to the low moisture thixotropic attapulgite. Suitable stabilizing fluids for use according to the present invention are those that, as indicated above, fill the interstices in the structure of the Fuller's earth clays, prevent the reflux of significant quantities of free moisture, and preserve the thixotropic properties so that the thixotrope may be shipped and stored in a conventional manner. As examples of such stabilizing fluids, mention may be made of flurochemicals of the group consisting of polymeric and nonpolymeric types comprising perflurocarbon chains, $CF_3CF_2CF_2$..., long chain carboxylic acids and silicone fluids.

The particularly preferred silicone fluids useful in the present invention are either organopolysiloxanes or organosilanes, are well known and readily available on the open market and therefore will not be discussed in detail here. These compounds have a carbon to silicon linkage and include such as disclosed in Hyde U.S. Pat. No. 2,490,357 and Warrick U.S. Pat. No. 2,541,137. Particularly preferred silicone fluids include (1) the group of linear alkylsilanes or alkenylsilanes in liquid form, preferably of less than 250 molecular weight and having a viscosity at 25° C. of between 0.25 and 100 centistokes or (2) completely condensed linear or cyclic organosiloxane derivatives, preferably of less than 12 silicon atoms per molecule for cyclic siloxanes, and having a viscosity at 25° C. of between 0.25 and 100 centistokes. While silicone fluids generally are usable in this invention, a preferred silane fluid is vinyl trimethoxy silane. A specific preferred siloxane fluid is vinyl modified polydimethyl siloxane, i.e., a polydimethyl siloxane in which, typically, 1% to 25% of the methyl side group have been replaced with vinyl groups. Another useful silicone fluid is octamethylcyclotetrasiloxane. We prefer to use from about 0.1 to about 10%, preferably about 0.2% to 2% of the silicone fluid.

EXAMPLES

Plastisols having the following compositions were prepared:

Example 1

| Plastisol A | Parts by Wt. | Plastisol B | Parts by Wt. |
| --- | --- | --- | --- |
| Geon 121 | 100 | Geon 121 | 100 |
| Dioctyl phthalate | 100 | Dioctyl phthalate | 75 |
| Sympron 1489 | 4 | Paraplex G-62 | 5 |
| Gamasperse 80 | 100 | Nuostabe V-1788 | 3 |
| Thixotrope (attapulgite vacuum dried & admixed with | 7 | Thixotrope (attapulgite vacuum dried and admixed with 1% | 10 |
| 1% vinyl modified polydimethyl siloxane)* | | octamethyl-cyclotetra-siloxane)** | |

*Union Carbide Fluid A-1751, Union Carbide Corp.
**Dow Corning 244 Fluid, Dow Corning Corp.

Geon is a trademark of the B. F. Goodrich Co. for polyvinyl chloride resin. Paraplex is a trademark of Rohm and Haas Co. for an epoxidized soy bean oil plasticizer. Nuostabe is a trademark of Tenneco Chemical Co. for a metal soap stabilizer of barium, cadmium and zinc. Sympron is a trademark of Synthetic Products Co. for a barium, cadmium, zinc and phosphate stabilizer. Gamasperse is a trademark of Georgia Marble for a calcium carbonate filler.

First, the thixotrope was prepared by placing typical thixotropic attapulgite clay in a vacuum chamber ( at approximately $10^{-2}$ Torr and heating the attapulgite at temperatures ranging up to 300° C. for a period sufficient to reduce the moisture content to approximately 0.2%. The time required will vary depending upon amount of the attapulgite, the size of the vacuum chamber, the amount of vacuum, etc., but in a typical chamber of 1 ft$^3$, with about 2 pounds of attapulgite held at about 150° C., will be about 3.5 hours. The vacuum chamber was re-filled with dry nitrogen gas, the dried thixotropic attapulgite was removed from the chamber and immediately divided approximately into two aliquots and silicone added to each. For the preparation of plastisol A, 1% of Union Carbide Silicone Fluid A-1751 was added to one aliquot of the dried attapulgite identified immediately above and the mixture tumbled until the siloxane was uniformly dispersed, resulting in a dry powder without evidence of an oily character.

For the preparation of plastisol B, 1% of Dow Corning 244 Fluid was added to the other aliquot of dried attapulgite and tumbled until uniformly dispersed. A similar dry powder resulted. The surface treated attapulgite samples were removed from the mixer and viscosity measurements were made at ambient temperature. A viscosity ratio of approximately 5 was obtained in each instance when the viscosity measured with a Brookfield Viscosimeter at 2 rpm was divided by the viscosity measured by the same instrument at 20 rpm. This ratio compared favorably to that of approximately 4 for thixotropic asbestos measured in the same manner. All samples of attapulgite prepared as described above retained their thixotropic character, and moisture did not reflux into the processed attapulgite after silicone treatment.

In another method of producing a thixotrope with a moderately low moisture content, a typical thixotropic attapulgite was placed in a standard drying oven and heated at a temperature between 100° C. and 350° C. for a time sufficient to reduce the moisture content to approximately 5% and intimately admixing this intermediate product with a silicone fluid by tumbling in a mixer, as described in detail in application 489,065.

The thixotropic attapulgite prepared according to either of the above described methods was then mixed with the other components of plastisols A and B. All compositions adhered well when applied to metal and produced satisfactory films when heat cured. None of the films exhibited discontinuities or bubbles.

Conventional thixotropic attapulgite, prepared by placing the clay in a drying oven at temperatures between 100° C. and 350° C. for a period sufficient to reduce the moisture content to approximately 5%, but without silicone treatment, rehydrates to about 10% to 15% moisture content within a few hours, depending upon ambient humidity conditions.

Samples of plastisols A and B were prepared using normal thixotropic attapulgite with a moisture content of about 12%. These samples resulted in undesirable films having visibly observable bubbles in the films.

This invention also has application for an adhesive sealant of the following composition:

Example 2

| Adhesive Sealant | |
|---|---|
| | Parts by Wt. |
| Pliovic K-80 resin | 100 |
| Dioctyl phthalate | 50 |
| Mark LL stabilizer | 2 |
| Tricresyl phosphate | 40 |
| Triethylene glycol dimethacrylate bonding agent | 20 |
| Duramite | 120 |
| Nytal 200 | 20 |
| Sparmite | 60 |
| Thixotrope | 4 |

Pliovic is a trademark of The Goodyear Co. for polyvinyl chloride resin. Mark LL is a trademark of Witco Chemical Co. for a barium cadmium stabilizer. Duramite is a trademark of Cyprus Mines Co. for calcium carbonate. Nytal is a trademark of R. T. Vanderbilt Co. for talc. Sparmite is a baryte of Pfizer Inc. The thixotrope is sepiolite which has been vacuum dried to 0.2% moisture and admixed with 1% Union Carbide A-171, a vinyl trimethoxy silane fluid.

This invention also has application for a compliance coating to meet emissions standards for volatile organic compounds (VOC's) as represented by the following composition:

Example 3

| VOC Compliance Coating | |
|---|---|
| | Parts by Wt. |
| D.E.R. 337 epoxy resin | 100 |
| Resimene 746 curing agent | 50 |
| Methyl ethyl ketone | 15 |
| Ti-Pure 900 | 40 |
| Thixotrope | 8 |

D.E.R. is a trademark of Dow Chemical Co. for epoxy resins. D.E.R. 337 is a low molecular weight oligomer. Resimene is a trademark of Monsanto Co. Ti-Pure 900 is a trademark of the DuPont Co. for titanium dioxide pigment. The thixotrope is attapulgite which has been vacuum dried to 0.2% moisture and admixed with 1% Union Carbide A-1751 silicone fluid.

The invention may also be practiced by combining the attapulgite clay or other thixotropic agents with the compounded plastic prior to vacuum drying. This method is less desirable, however.

Attapulgite is a member of a group of clays called Fuller's earth. Other clays in this family are sepiolite and palygorskite, which also have application interchangeably as low moisture thixotropic agents in plastics and coatings when processed according to the teachings of this invention, as indicated above.

While rather specific terms have been used to describe various embodiments of the present invention, they are not intended nor should they be construed as a limitation upon the invention as defined by the following claims:

We claim: CLAIMS

1. A thixotropic attapulgite having a moisture content of from about 0.1% to about 2%.

2. The thixotropic attapulgite of claim including a stabilizing fluid to preserve its low moisture properties.

3. The thixotropic attapulgite of claim 2, wherein the stabilizing fluid comprises from about 0.1% to about 10% of a silicone fluid.

4. The thixotropic attapulgite of claim 3, wherein the quantity of silicone fluid is from about 0.2% to about 2%.

5. The thixotropic attapulgite of claim 3, wherein the silicone fluid is selected from the group consisting of vinyl modified polydimethyl siloxane, octamethylcyclotetrasiloxane and vinyl trimethoxy silane.

6. A thixotropic Fuller's earth clay mineral selected from the group consisting of palygorskite and sepiolite, having a moisture content of from about 0.1% to about 5%.

7. The thixotropic mineral of claim 6, including a stabilizing fluid to preserve its low moisture property.

8. The thixotropic mineral of claim 7, wherein the stabilizing fluid comprises from about 0.1% to about 10% of a silicone fluid.

9. The thixotropic mineral of claim 8, wherein the quantity of silicone fluid is from about 0.2% to about 10. The thixotropic mineral of claim 8, wherein the silicone is selected from the group consisting of vinyl modified polydimethyl siloxance, octamethylcyclotetrasiloxane and vinyl trimethoxy silane.

11. A method for producing a thixotropic Fuller's earth clay which comprises the steps of: (1) heating the clay in a vacuum of from about 1 Torr to about $10^{-4}$ Torr at a temperature up to about 300° C. for a time sufficient to reduce the moisture content of the clay to from about 0.1% to about 5% and (2) intimately admixing the product of step 1 with a stabilizing fluid selected from the group consisting of polymeric and nonpolymeric flurocarbons, long chain carboxylic acids, silicones and combinations thereof, to preserve its low moisture properties.

12. The method of claim 11, wherein the stabilizing fluid comprises from about 0.1% to about 10% of a silicone fluid.

13. The method of claim 12, wherein the quantity of silicone fluid is from about 0.2% to about 2%.

14. The method of claim 12, wherein the silicone is selected from the group consisting of vinyl modified polydimethyl siloxane, octamethylcyclotetrasiloxane and vinyl trimethoxy silane.

15. A compounded plastic comprising, for each 100 parts by weight of plastic resin, from about 45 to about 100 parts plasticizer, from about 1 to about 5 parts stabilizer, from 0 to about 100 parts filler and from about 2 to about 15 parts of a thixotropic Fuller's earth clay mineral selected from the group consisting of attapulgite, sepiolite and palygorskite, and having a moisture content of from about 0.1% to about 5%.

16. A compliance coating comprising, for each 100 parts oligomer resin, from 0 to about 12.5 parts curing agent, from about 5 to about 200 parts solvent, from about 2 to about 100 parts pigment, from about 2 to about 15 parts of a thixotropic Fuller's earth clay mineral from the group consisting of attapulgite, sepiolite and palygorskite, and having a moisture content of from about 0.1% to about 5%.

* * * * *